(12) United States Patent
Tokiyasu (10) Patent No.: US 12,269,130 B2
(45) Date of Patent: Apr. 8, 2025

(54) WHEEL HOLDING DEVICE

(71) Applicant: Honda Motor Co., Ltd., Tokyo (JP)

(72) Inventor: Masakazu Tokiyasu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 332 days.

(21) Appl. No.: 17/952,309

(22) Filed: Sep. 25, 2022

(65) Prior Publication Data
US 2023/0150071 A1    May 18, 2023

(30) Foreign Application Priority Data

Nov. 18, 2021    (JP) .................................. 2021-187541

(51) Int. Cl.
*B25B 11/00*    (2006.01)
*B23K 37/04*    (2006.01)

(52) U.S. Cl.
CPC .................................... *B23K 37/04* (2013.01)

(58) Field of Classification Search
CPC    B23K 37/04; B23K 20/1225; B23K 37/0211; B25B 5/00; B25B 11/00; B23Q 3/00
See application file for complete search history.

(56) References Cited

U.S. PATENT DOCUMENTS

| | | | | |
|---|---|---|---|---|
| 2,800,867 | A * | 7/1957 | Oliver ................ | B23K 37/0533 269/189 |
| 3,973,615 | A * | 8/1976 | Cunha ................ | B60C 25/145 157/1.21 |
| 5,282,403 | A * | 2/1994 | Rouleau ............. | B25B 5/147 82/127 |
| 7,367,546 | B1 * | 5/2008 | Rodriguez .......... | B66F 5/025 254/2 B |
| 7,891,067 | B2 * | 2/2011 | Muhlenbruck ..... | A01K 85/00 29/272 |
| 10,974,376 | B2 * | 4/2021 | Peltier ................ | F16H 57/08 |
| 11,167,394 | B2 * | 11/2021 | Roberts .............. | B25B 27/16 |
| 2011/0070997 | A1 | 3/2011 | Gomi et al. | |

(Continued)

FOREIGN PATENT DOCUMENTS

| | | |
|---|---|---|
| JP | 2005022048 | 1/2005 |
| JP | 2011068161 | 4/2011 |

(Continued)

OTHER PUBLICATIONS

"Office Action of Japan Counterpart Application", issued on May 14, 2024, with English translation thereof, p. 1-p. 6.

*Primary Examiner* — Lee D Wilson
(74) *Attorney, Agent, or Firm* — JCIPRNET (57) ABSTRACT

A wheel holding device holding a wheel including an annular-shaped core body and a plurality of free rollers rotatably supported by the core body includes a central member including an outer peripheral part capable of expanding and contracting in a radial direction. The central member holds the wheel with the outer peripheral part of the central member urging an inner peripheral part of the wheel radially outward. The central member may include a chuck, a plurality of bases which are radially movably supported by the chuck and form the outer peripheral part of the central member, and a plurality of urging members which urge the respective bases radially outward with respect to the chuck.

12 Claims, 10 Drawing Sheets

(56) References Cited

U.S. PATENT DOCUMENTS

| | | | | |
|---|---|---|---|---|
| 2013/0037221 A1* | 2/2013 | Kliskey | ................ | B60C 25/147 |
| | | | | 157/1 |
| 2015/0328714 A1* | 11/2015 | Larsson | ................ | B23K 37/04 |
| | | | | 228/112.1 |
| 2020/0018431 A1* | 1/2020 | Takata | ................... | B23K 31/02 |
| 2023/0150071 A1* | 5/2023 | Tokiyasu | ............. | B23K 26/242 |
| | | | | 269/55 |

FOREIGN PATENT DOCUMENTS

| | | |
|---|---|---|
| JP | 2018086903 | 6/2018 |
| JP | 6746655 | 8/2020 |

\* cited by examiner

WHEEL HOLDING DEVICE

CROSS-REFERENCE TO RELATED APPLICATION

This application claims the priority benefit of Japan application serial no. 2021-187541, filed on Nov. 18, 2021. The entirety of the above-mentioned patent application is hereby incorporated by reference herein and made a part of this specification.

BACKGROUND

Technical Field

The disclosure relates to a wheel holding device for holding a wheel used in an omnidirectional moving device.

Related Art

Patent Document 1 (Japanese Patent No. 6746655) discloses a method of manufacturing a wheel used in an omnidirectional moving device. The wheel includes an annular-shaped core body and a plurality of free rollers rotatably supported by the core body. The method of manufacture the wheel includes: a first step of forming a plurality of notches in a straight line-shaped pipe member; a second step of attaching a plurality of free rollers to the straight line-shaped pipe member; a third step of bending the pipe member at a plurality of spots to fill the plurality of notches to form the pipe member into an annular shape; and a fourth step of welding end parts of the pipe member to each other and welding edge parts of each notch to each other.

To facilitate the welding work of the pipe member in the fourth step, a wheel holding device for holding the wheel is desired. The wheel including the annular-shaped core body and the plurality of free rollers rotatably supported by the core body does not have a central part, so there is no suitable device for holding the wheel.

SUMMARY

In an embodiment of the disclosure, a wheel holding device (1) holds a wheel (4) including an annular-shaped core body (2) and a plurality of free rollers (3) rotatably supported by the core body. The wheel holding device includes a central member (40) including an outer peripheral part capable of expanding and contracting in a radial direction. The central member holds the wheel with the outer peripheral part of the central member urging an inner peripheral part of the wheel radially outward.

According to this embodiment, it is possible to provide a wheel holding device for holding a wheel including an annular-shaped core body and a plurality of free rollers rotatably supported by the core body. A central member is arranged at a central part of the annular-shaped wheel and can hold the wheel at its outer peripheral part. The outer peripheral part of the central member can extend radially outward and come into contact with the inner peripheral part of the wheel.

In the above embodiment, the central member may include a chuck (42); a plurality of bases (43) which are radially movably supported by the chuck and form the outer peripheral part of the central member; and a plurality of urging members (44) which urge the respective bases radially outward with respect to the chuck.

According to this embodiment, the structure of the central member can be simplified.

In the above embodiment, the central member may include a stopper (54) detachably attached to the chuck. The stopper may restrict radially inward movement of the base by coming into contact with each of the bases.

According to this embodiment, radially inward contraction of the core body can be suppressed. For example, it is possible to suppress contraction of the core body during welding and maintain the core body in an appropriate shape.

In the above embodiment, the central member may include a plurality of lock members (61) detachably attached to the chuck. The plurality of lock members may restrict movement of the bases with respect to the chuck by coming into contact with each of the bases.

According to this embodiment, the lock member can maintain the base radially inward against the urging force of the urging member. This facilitates the work of arranging the wheel on the outer circumference of the central member.

In the above embodiment, the wheel holding device may include at least one band member (81) which extends along an outer peripheral surface of one of the free rollers and includes two end parts detachably attached to one of the bases.

According to this embodiment, when the position of the base is fixed by the lock members, the position of the wheel can be kept constant by bringing the wheel into close contact with the bases by the band members.

In the above embodiment, the wheel holding device may include a clamping device (70) including a bracket (71); and a pair of holding pieces (72) which are provided on the bracket and sandwich the free rollers in a circumferential direction of the wheel.

According to this embodiment, when a part of the core body in the circumferential direction is cleaved, the core body can be held in an annular shape by the clamping device. The clamping device is useful, for example, when a straight pipe is bent in an annular shape and welded.

In the above embodiment, the bracket may be detachably attached to one of the bases.

According to this embodiment, it is possible to prevent the bracket from falling off from the wheel.

In the above embodiment, the bracket may have at least one opening (79) for exposing, to outside, the core body arranged between the free rollers arranged between the pair of holding pieces.

According to this embodiment, it is possible to perform operations such as welding on the core body with the clamping device attached to the wheel.

In the above embodiment, the pair of holding pieces may be detachably attached to the bracket.

According to this embodiment, after the bracket is arranged with respect to the wheel, the pair of holding pieces can be attached to the bracket. This facilitates the work of attaching the clamping device to the wheel.

In the above embodiment, the plurality of bases may each have an engaging groove (49) which extends in a circumferential direction and receives a part of the free roller.

According to this embodiment, the wheel holding device can hold the wheel with good stability.

In the above embodiment, the wheel holding device may include a pedestal (41) which rotatably supports the chuck.

According to this embodiment, the wheel can be rotated by rotating the central member. Accordingly, a processing device can process each part in the circumferential direction of the core body without moving an operation part of the processing device.

According to the above configuration, it is possible to provide a wheel holding device for holding a wheel including an annular-shaped core body and a plurality of free rollers rotatably supported by the core body.

DESCRIPTION OF THE EMBODIMENTS

Embodiments of the disclosure provide a wheel holding device for holding a wheel including an annular-shaped core body and a plurality of free rollers rotatably supported by the core body.

Figure 1:
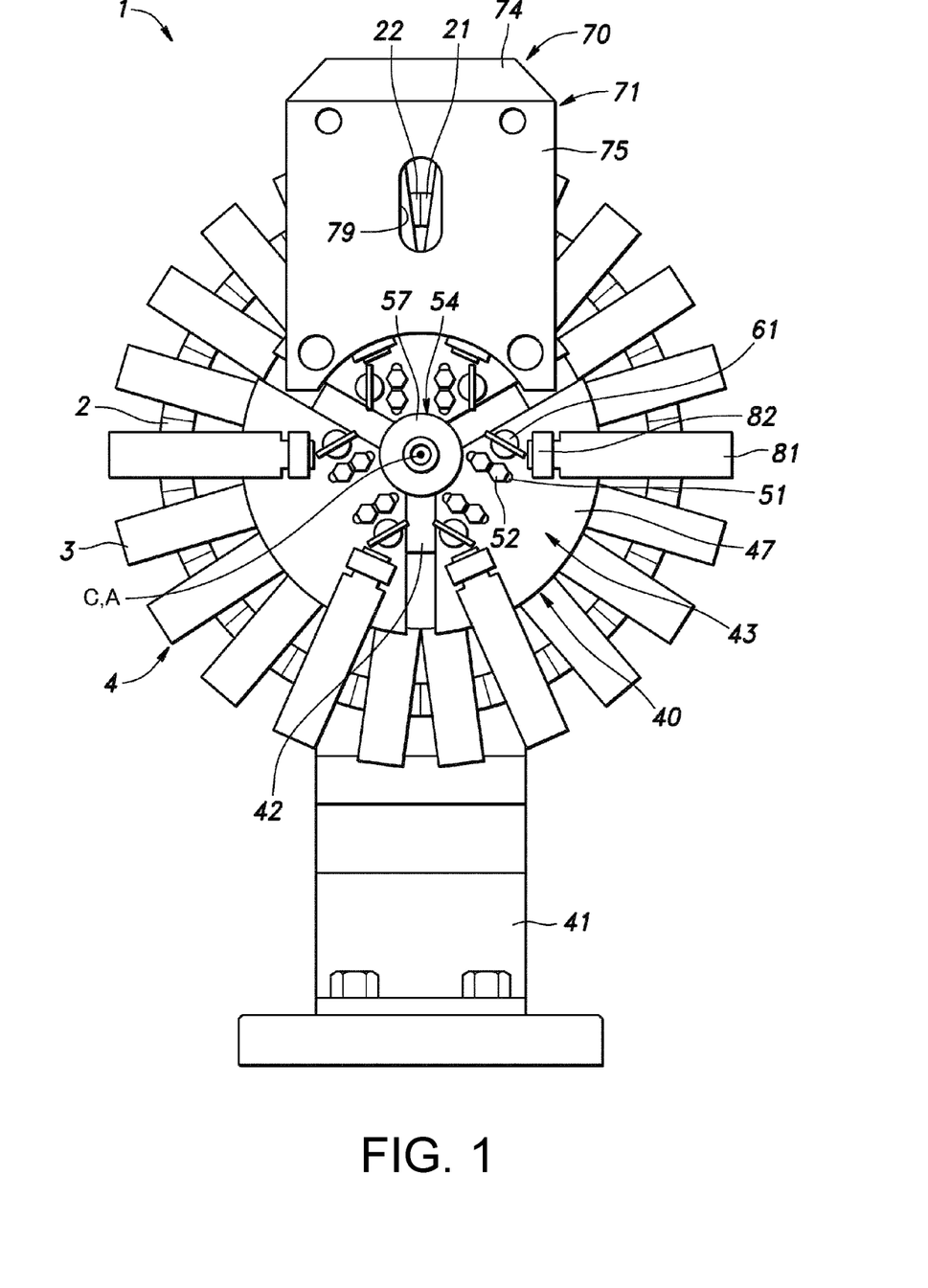
FIG. 1 is a front view of a wheel holding device according to an embodiment.
Figure 2:
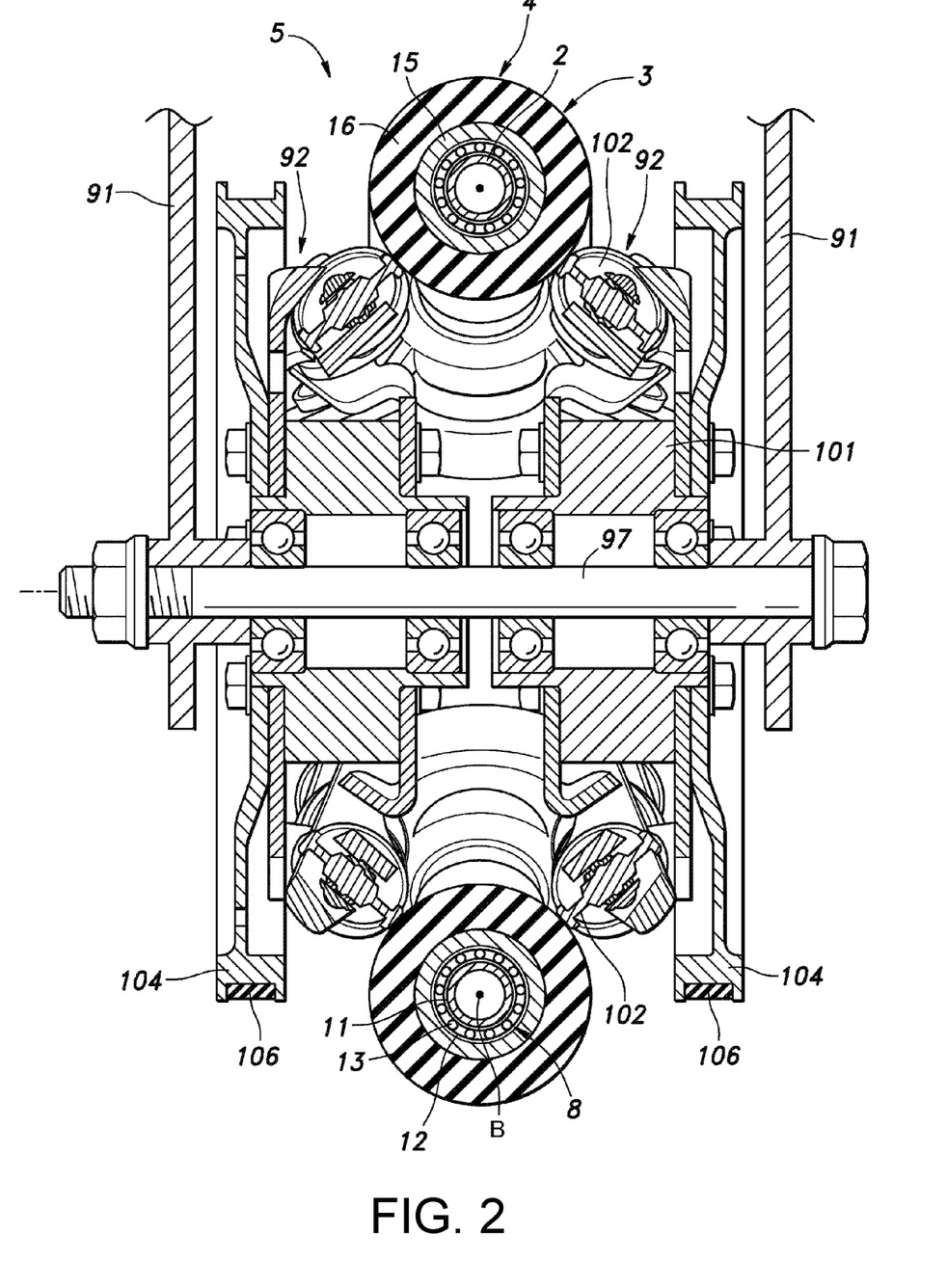
FIG. 2 is a cross-sectional view of an omnidirectional moving device including a wheel.

Hereinafter, a wheel holding device 1 according to the disclosure will be described with reference to the drawings. As shown in FIG. 1, the wheel holding device 1 holds a wheel 4 including an annular-shaped core body 2 and a plurality of free rollers 3 rotatably supported by the core body 2. In particular, the wheel holding device 1 is used during production of the wheel 4. As shown in FIG. 2, the wheel 4 is used in an omnidirectional moving device 5. The omnidirectional moving device 5 is used for electric wheelchairs, trolleys, or personal mobility devices.

(Structure of Wheel 4)

Figure 3:
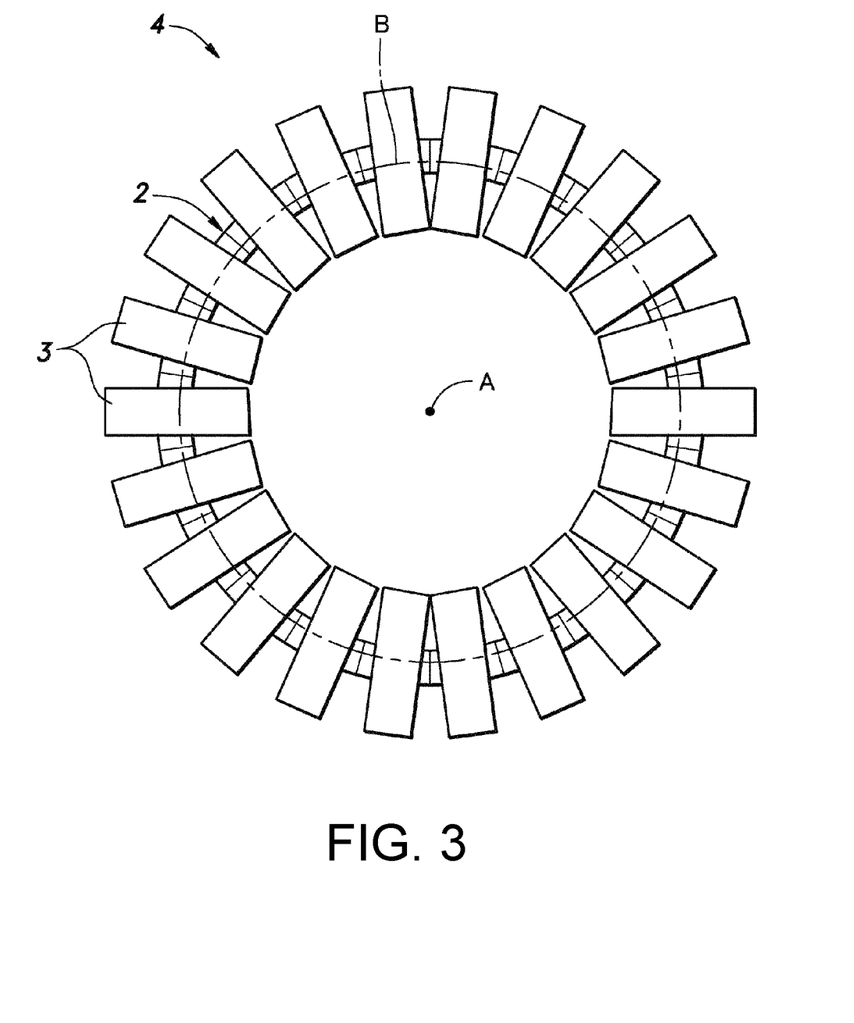
FIG. 3 is a side view of the wheel.

As shown in FIG. 3, the wheel 4 includes a core body 2 formed in an annular shape centered on an axis A. The core body 2 is formed by bending a pipe member 7 having a circular cross section into an annular shape and welding its two end parts to each other. The pipe member 7 is made of a metal such as stainless steel. A line passing through a center of the cross section of the core body 2 is defined as a core body center line B. The core body center line B extends in a circumferential direction centered on the axis A.

Figure 4:
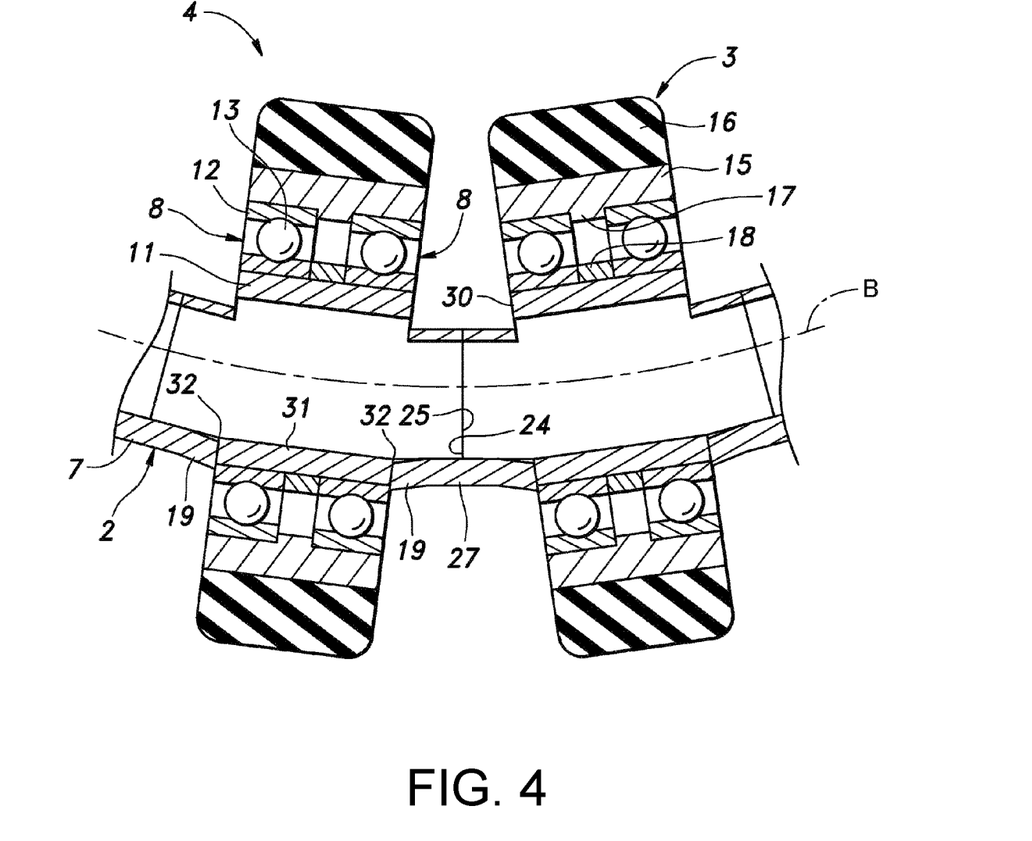
FIG. 4 is a cross-sectional view of the wheel.

As shown in FIG. 4, each free roller 3 is supported by the core body 2 via a bearing 8 which is a radial bearing. The bearing 8 may be a ball bearing including an inner race 11, an outer race 12, a plurality of balls 13 interposed between the inner race 11 and the outer race 12, and a retainer (not shown) holding the plurality of balls 13.

Each free roller 3 includes a sleeve 15 and a rubber ring 16 provided on an outer peripheral surface of the sleeve 15. The sleeve 15 may be made of metal. The rubber ring 16 may be bonded to the outer peripheral surface of the sleeve 15 by vulcanization bonding or the like. The bearing 8 is arranged inside the sleeve 15. In this embodiment, two bearings 8 are press-fitted inside each sleeve 15. At a central part of an inner peripheral surface of the sleeve 15, a protrusion 17 which projects radially inward and extends in the circumferential direction is formed. The outer races 12 of the two bearings 8 come into contact with the protrusion 17 and a cylinder-shaped spacer 18, so that the two bearings 8 are spaced apart from each other.

The inner race 11 of each bearing 8 is fixed to an outer peripheral surface of the core body 2. The core body 2 is press-fitted into the inner race 11 of each bearing 8. Further, a locking claw 19 projecting outward is formed on the outer peripheral surface of the core body 2. The locking claw 19 is formed by cutting a part of the core body 2 outward. The locking claw 19 locks an edge part of the inner race 11 and restricts movement of each inner race 11 and the spacer 18 with respect to the core body 2 in the circumferential direction centered on the axis A.

Each of the plurality of free rollers 3 rotates with respect to the core body 2 on the core body center line B. Further, each of the plurality of free rollers 3 rotates with respect to the core body 2 on an axis parallel to a tangent line centered on the axis A.

(Production Method of Wheel)

Figure 5:
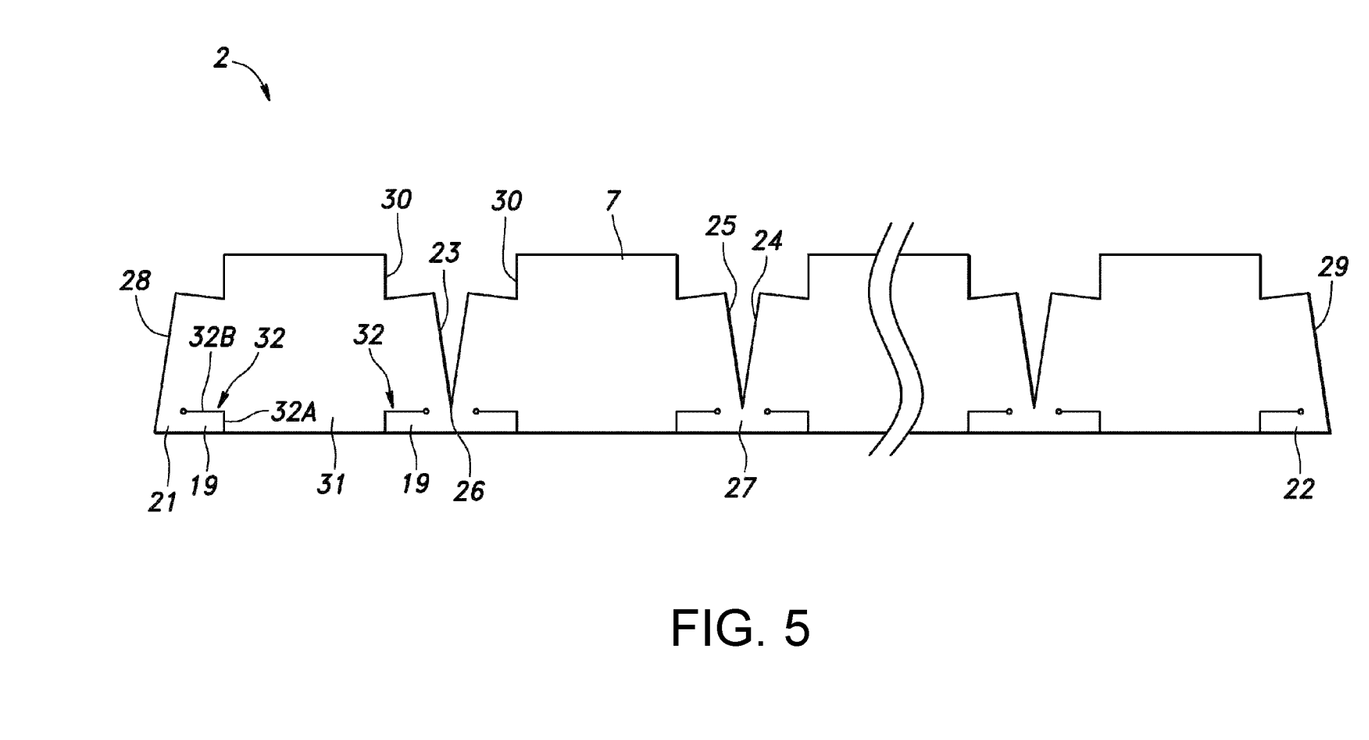
FIG. 5 is a side view showing a straight line-shaped core body.
Figure 6:
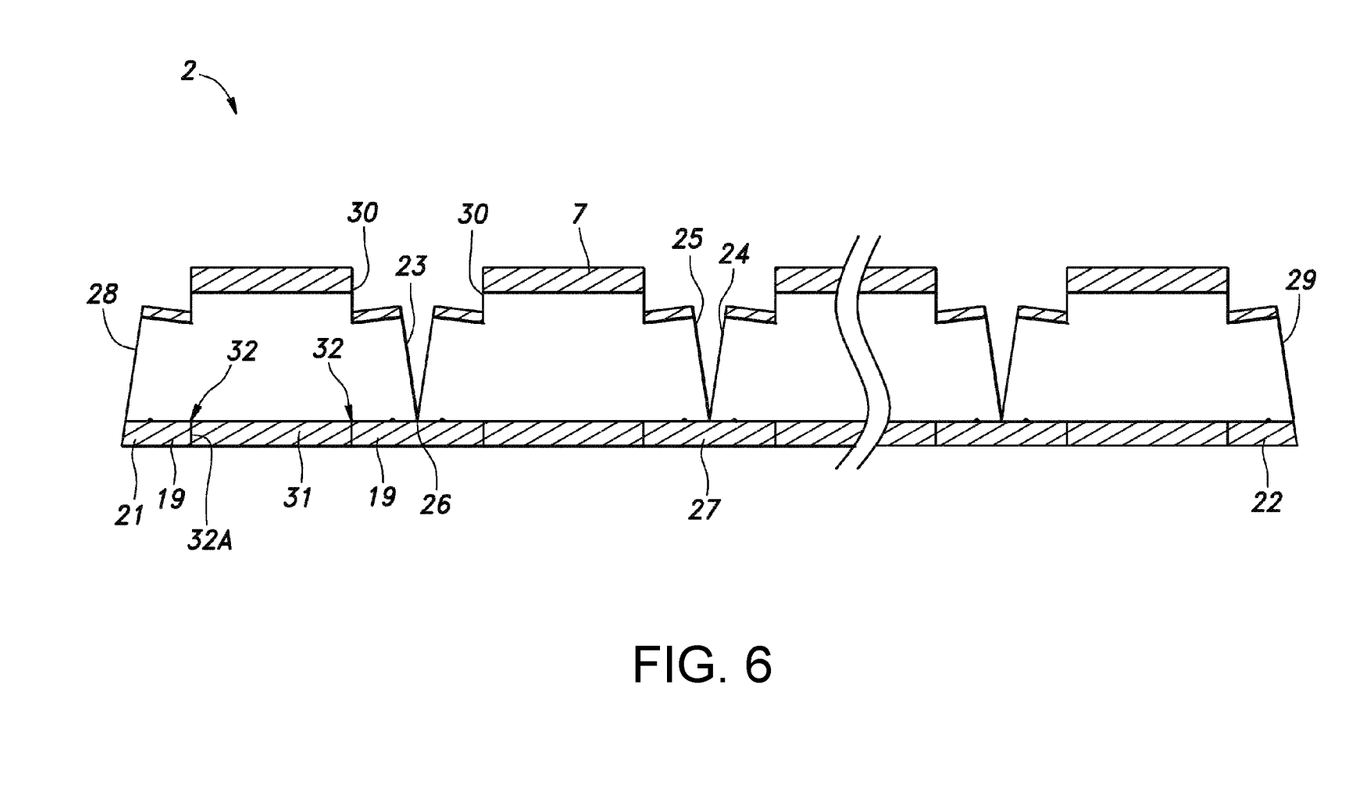
FIG. 6 is a cross-sectional view showing the straight line-shaped core body.
Figure 7:
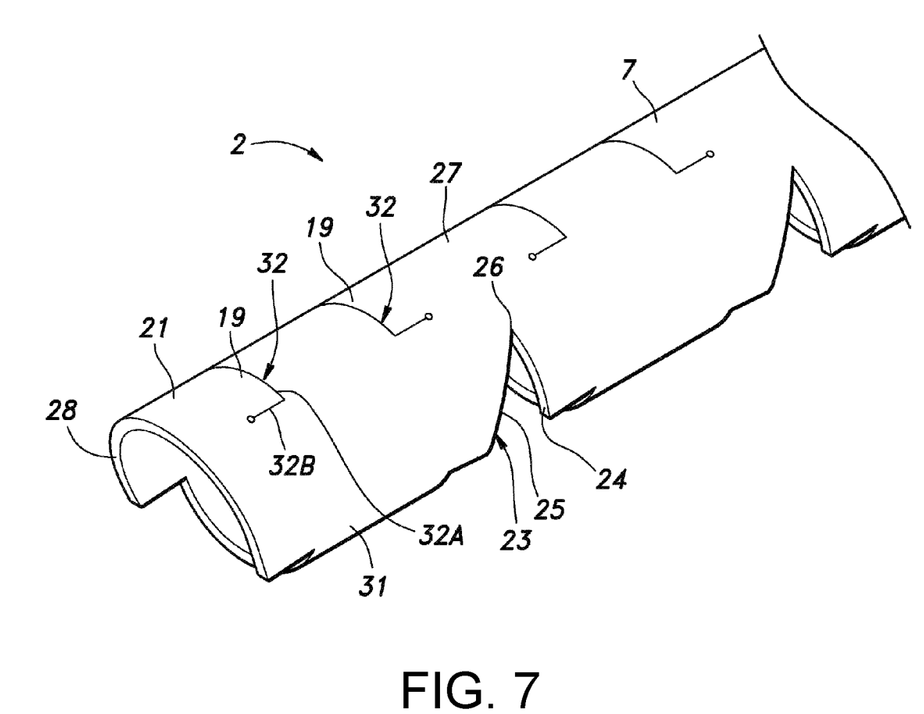
FIG. 7 is a perspective view showing the straight line-shaped core body.

As shown in FIG. 5 to FIG. 7, the core body 2 is formed by bending a pipe member 7 having a circular cross section and extending in a straight line shape. The pipe member 7 has a first end part 21 and a second end part 22 in a longitudinal direction. The core body 2 in an initial state extending in a straight line shape has a plurality of notches 23 arranged at equal intervals in the longitudinal direction. Each notch 23 is formed in a same shape. Further, each notch 23 is arranged at a same position in a circumferential direction centered on the core body center line B of the core body 2. Each notch 23 penetrates from an outer peripheral surface to an inner peripheral surface of the core body 2. Each notch 23 extends in a range of at least 270 degrees or more in the circumferential direction centered on the core body center line B of the core body 2 in the initial state. Each notch 23 extends in a range of 330 degrees in the circumferential direction centered on the core body center line B of the core body 2, for example. Each notch 23 is formed by a first cut surface 24 having a planar shape and a second cut surface 25 having a planar shape. The first cut surface 24 and the second cut surface 25 intersect with each other by a ridge line 26 having a straight line shape. The notch 23 is formed in a triangular shape when viewed from a direction parallel to the ridge line 26. An expansion part 30 is provided on a side of the notch 23 opposite to the ridge line 26 side. In the longitudinal direction of the pipe member 7, the expansion part 30 is formed to be larger than the notch 23. In this embodiment, the notch 23 is formed in an isosceles triangle when viewed from a direction parallel to the ridge line 26. An angle formed by the first cut surface 24 and the second cut surface 25 may be set to a value obtained by dividing substantially 360 degrees by the number of the free rollers 3. In the core body 2, a portion of the core body 2 opposite to each notch 23 is referred to as a connecting part 27. A first end surface 28 parallel to the first cut surface 24 is formed at the first end part 21, and a second end surface 29 parallel to the second cut surface 25 is formed at the second end part 22. In the longitudinal direction of the pipe member 7, the second cut surface 25 is arranged next to the first end surface 28, and the first cut surface 24 is arranged next to the second end surface 29.

In the core body 2, a cylinder-shaped roller support part 31 is formed respectively between the adjacent notches 23. A plurality of slits 32 for forming the locking claws 19 are formed on a side opposite to the notch 23 in the circumferential direction of the core body 2. A pair of slits 32 are provided for each roller support part 31. The slit 32 penetrates the core body 2 from the outer peripheral surface to the inner peripheral surface. The slit 32 has a first portion 32A extending in the circumferential direction of the core body 2 along two ends in a longitudinal direction of the roller support part 31, and a pair of second portions 32B extending from two ends of the first portion 32A to a side opposite to the roller support part 31. Each locking claw 19 is defined by the first portion 32A and the pair of second portions 32B.

First, as a first step, a plurality of notches 23, a plurality of slits 32, a first end surface 28, and a second end surface 29 are formed on a straight line-shaped core body 2. The plurality of notches 23, the plurality of slits 32, the first end surface 28, and the second end surface 29 may be formed by laser processing.

Next, as a second step, a plurality of free rollers 3 each attached with a pair of bearings 8 and a spacer 18 are respectively arranged on roller support parts 31 of the straight line-shaped core body 2. The pair of bearings 8 are press-fitted into a sleeve 15 of the free roller 3 and fixed. The straight line-shaped core body 2 is press-fitted into each bearing 8 from its end part. In this state, the pair of bearings 8 attached to one free roller 3 are arranged on the roller support part 31 and are arranged between a pair of slits 32.

Next, as a third step, each locking claw 19 is pushed and bent outward of the core body 2. Accordingly, the pair of bearings 8 and the sleeve 15 are sandwiched between a pair of locking claws 19, and the position of the free roller 3 is fixed with respect to the longitudinal direction of the core body 2. Each locking claw 19 is pushed and bent outward of the core body 2 by a pressing rod inserted inside the core body 2 through an expansion part 30, and projects from the outer peripheral surface of the core body 2. Accordingly, the end part of each locking claw 19 comes into contact with the edge part of the inner race 11 of the bearing 8.

Next, as a fourth step, the core body 2 is bent at each connecting part 27 to form an annular shape. Each connecting part 27 is bent so that the corresponding notch 23 is filled, that is, the first cut surface 24 and the second cut surface 25 of the corresponding notch 23 come into contact with each other. Accordingly, the first end surface 28 and the second end surface 29 of the core body 2 can come into contact with each other. If the holding force for maintaining the core body 2 in the bent state disappears, the first end surface 28 and the second end surface 29 of the core body 2 would become separated from each other due to spring-back of the core body 2.

Next, as a fifth step, the first end surface 28 and the second end surface 29 of the core body 2 are welded to each other, and the first cut surface 24 and the second cut surface 25 of each notch 23 are welded to each other. Accordingly, the core body 2 is maintained in an annular shape, and the main wheel is completed. The wheel holding device 1 according to this embodiment is suitable for holding the wheel 4 before welding in the fifth step.

(Wheel Holding Device)

Figure 8:
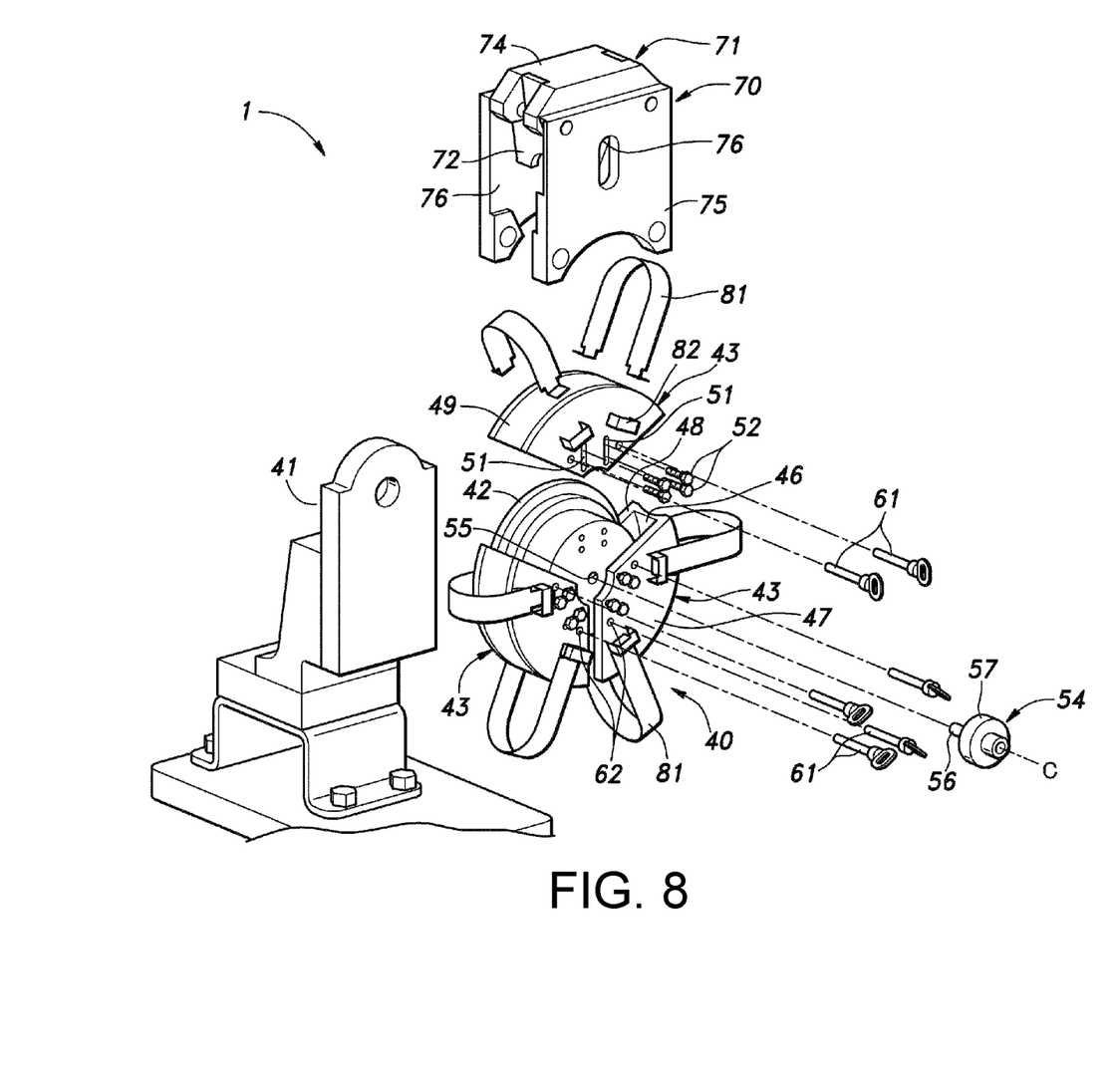
FIG. 8 is an exploded perspective view of the wheel holding device according to the embodiment.
Figure 9:
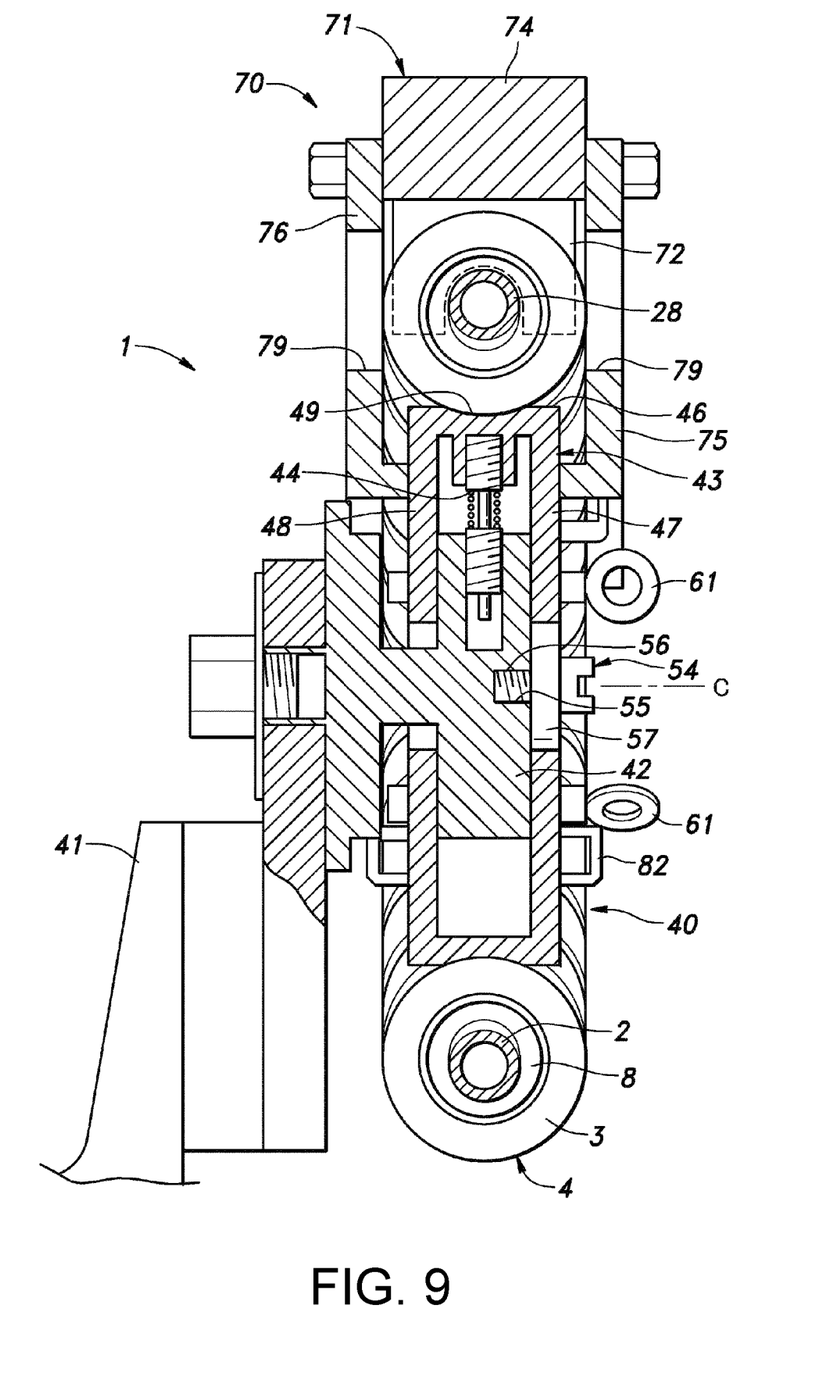
FIG. 9 is a cross-sectional view of the wheel holding device holding the wheel.

As shown in FIG. 1, FIG. 8, and FIG. 9, the wheel holding device 1 includes a central member 40 having an outer peripheral part that can be expanded and contracted in the radial direction. The wheel holding device 1 includes a pedestal 41 which supports the central member 40. The central member 40 includes a chuck 42, a plurality of bases 43 which are supported by the chuck 42 to be movable in the radial direction and form the outer peripheral part of the central member 40, and a plurality of urging members 44 which urge the respective bases 43 radially outward with respect to the chuck 42.

The chuck 42 is formed in a disk shape centered on a central axis C. The chuck 42 is supported by the pedestal 41 to be rotatable on the central axis C. Each of the bases 43 includes a peripheral wall part 46 which faces an outer peripheral surface of the chuck 42 and extends in an arc shape in the circumferential direction, an outer wall 47 which extends from the peripheral wall part 46 toward the central axis C side along an outer surface of the chuck 42, and an inner wall 48 which extends from the peripheral wall part 46 toward the central axis C side along an inner surface of the chuck 42. That is, a part of the chuck 42 is arranged between the outer wall 47 and the inner wall 48 of the base 43. The outer wall 47 and the inner wall 48 may be formed in a fan shape. The plurality of bases 43 may each have an engaging groove 49 which extends in the circumferential direction and receives a part of the free roller 3. The engaging groove 49 may be formed on the outer peripheral part of the peripheral wall part 46 and extend to two end parts of the peripheral wall part 46 in the circumferential direction. The engaging groove 49 may have a semi-circular cross section. Each of the bases 43 may be formed in a same shape as each other.

A guide groove 51 penetrating in a thickness direction is formed in the outer wall 47 of each base 43. At least one guide pin 52 passing through the guide groove 51 is coupled to the chuck 42. A movement direction of the base 43 with respect to the chuck 42 is restricted by the guide pin 52 coming into contact with the guide groove 51. In this embodiment, two guide pins 52 are provided for one guide groove 51. With the two guide pins 52 coming into contact with the guide groove 51, an inclination angle of the base 43 with respect to the chuck 42 is kept constant. In this embodiment, two guide grooves 51 are provided in one outer wall 47. The inner wall 48 may be provided with a guide groove 51 and a corresponding guide pin 52 may be provided.

The movement of each base 43 with respect to the chuck 42 is restricted between a contracted position and an expanded position by the contact between the guide groove 51 and the guide pins 52. When the base 43 is at the contracted position, a distance between the base 43 and the central axis C is minimized. When the base 43 is at the expanded position, the distance between the base 43 and the central axis C is maximized.

The urging member 44 is, for example, a compression coil spring, and is provided between the outer peripheral wall of the chuck 42 and the inner peripheral wall of each base 43. Each urging member 44 urges the corresponding base 43 toward the expanded position. In this embodiment, the urging member 44 is interposed between a cylinder-shaped first member screwed into the chuck 42 and a second member having one end movably supported inside the first member and another end screwed into the base 43.

The central member 40 includes a stopper 54 which is detachably attached to the chuck 42 and restricts the radially inward movement of the base 43 by coming into contact with each of the bases 43. A coupling hole 55 formed along the central axis C is formed at the center of the chuck 42. The stopper 54 includes a shaft part 56 inserted into the coupling hole 55, and a head part 57 which is provided at one end of the shaft part 56 and is wider in the radial direction than the shaft part 56. A female screw may be formed on an inner peripheral surface of the coupling hole 55, and a male screw screwed into the female screw may be formed on an outer peripheral surface of the shaft part 56. With an outer peripheral part of the head part 57 coming into contact with an end part of the outer wall 47 of each base 43 on the central axis C side, the movement of each base 43 toward the contracted position side is restricted. When the outer peripheral part of the head part 57 comes into contact with the end part of the outer wall 47 of each base 43 on the central axis C side, each base 43 may be arranged at a predetermined position between the contracted position and the expanded position.

The central member 40 includes a plurality of lock members 61 which are detachably attached to the chuck 42 and restrict the movement of the base 43 with respect to the chuck 42 by coming into contact with the respective bases 43. A lock hole 62, which is a through hole, is formed in the outer wall 47 and the inner wall 48 of each base 43 and the chuck 42. By inserting the lock member 61 into each lock hole 62, the movement of the base 43 with respect to the chuck 42 is prohibited. The lock member 61 may be, for example, a pin.

The wheel holding device 1 includes a clamping device 70 in addition to the central member 40. The clamping device 70 is attached to one of the plurality of bases 43. The clamping device 70 includes a bracket 71 and a pair of holding pieces 72 which are provided on the bracket 71 and sandwich a plurality of free rollers 3 in the circumferential direction of the wheel 4.

The bracket 71 includes a main body part 74, and a first wall 75 and a second wall 76 which extend from the main body part 74 in a same direction at an interval from each other. The first wall 75 and the second wall 76 are formed in plate shapes facing each other. A distance between the first wall 75 and the second wall 76 is set to be larger than an outer diameter of the free roller 3. The first wall 75 is detachably connected to a side surface of the outer wall 47 of one base 43 by a fastening member such as a bolt, and the second wall 76 is detachably connected to a side surface of the inner wall 48 of the same base 43 by a fastening member such as a bolt. Accordingly, the main body part 74 is arranged at an interval radially outward of the peripheral wall part 46 of the base 43. A distance between the main body part 74 and the peripheral wall part 46 is set to be larger than the outer diameter of the free roller 3. The main body part 74 is arranged on the outer side of the wheel 4 held by the outer peripheral part of the base 43.

Figure 10:
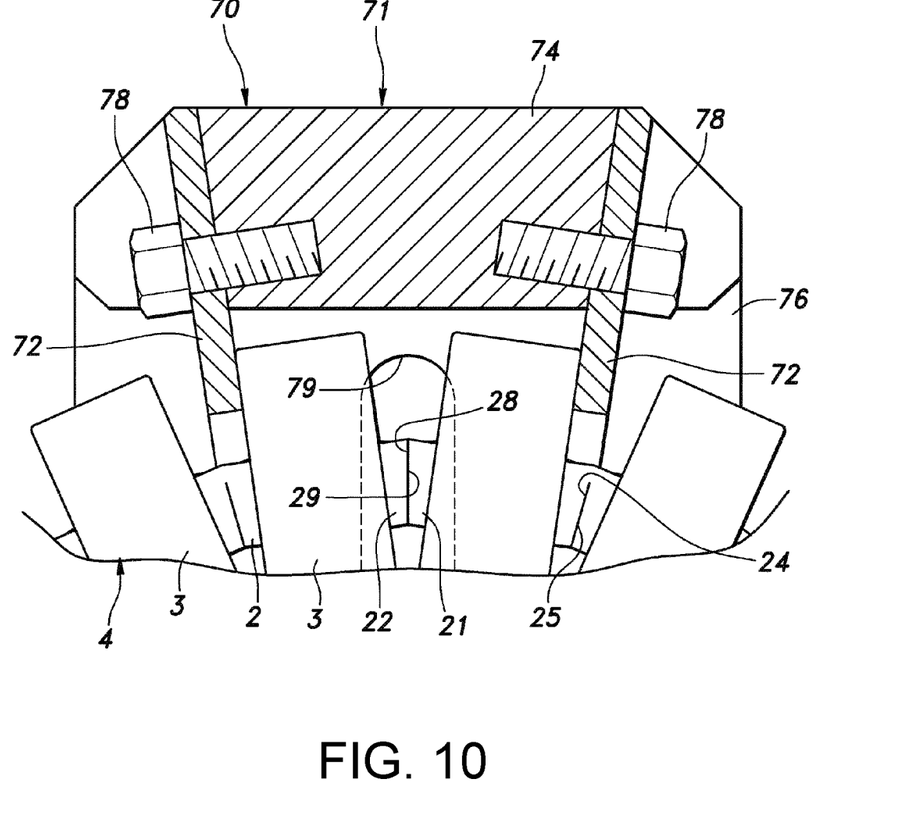
FIG. 10 is a cross-sectional view of a clamping device clamping the wheel.

As shown in FIG. 10, each of the pair of holding pieces 72 is formed in a plate shape. One of the holding pieces 72 is connected to one end of the main body part 74 in the circumferential direction centered on the central axis C, and the other of the holding pieces 72 is connected to another end of the main body part 74 in the circumferential direction. The pair of holding pieces 72 extend from the main body part 74 toward the central axis C side and face each other in the circumferential direction centered on the central axis C. The pair of holding pieces 72 may be detachably attached to the main body part 74 by a fastening member 78 such as a bolt.

As shown in FIG. 1 and FIG. 8 to FIG. 10, the bracket 71 has at least one opening 79 for exposing, to the outside, the core body 2 arranged between the free rollers 3 arranged between the pair of holding pieces 72. The opening 79 is formed respectively in the first wall 75 and the second wall 76.

As shown in FIG. 1 and FIG. 8, the wheel holding device 1 may include at least one band member 81. The band member 81 extends along the outer peripheral surface of one of the free rollers 3 of the wheel 4 arranged on the outer peripheral part of the central member 40, and has two end parts detachably attached to one of the bases 43. In this embodiment, two band members 81 are attached to each base 43. Two end parts of the band member 81 are locked to locking parts 82 provided on the outer surface of the outer wall 47 and the outer surface of the inner wall 48 of the base 43.

A method of holding the wheel 4 before welding (the wheel 4 for which the processes up to the fourth step have been completed) by the wheel holding device 1 will be described. The wheel 4 before welding is arranged in a substantially annular shape, but the first end surface 28 and the second end surface 29 of the core body 2 are separated from each other due to springback.

First, the plurality of lock members 61 are inserted into the lock holes 62, and each base 43 is maintained at a predetermined position with respect to the chuck 42. This facilitates the work of arranging the wheel 4 on the outer circumference of the central member 40. Further, the stopper 54 is coupled to the chuck 42. With the lock members 61 inserted into the lock holes 62, a gap is formed between the stopper 54 and each base 43. Next, the wheel 4 before welding is arranged on the outer peripheral part of the central member 40, that is, on the outer peripheral part of each base 43. At this time, the inner peripheral part of the wheel 4 is received by the engaging groove of the peripheral wall part 46 of each base 43. Further, two end parts of the core body 2 constituting the wheel 4 are arranged at a center in the circumferential direction of the base 43 attached with the clamping device 70.

Next, the plurality of band members 81 are attached to the corresponding bases 43. Accordingly, the wheel 4 is held between the plurality of bases 43 and the plurality of band members 81. The plurality of band members 81 maintain the wheels 4 in a substantially perfect circle along the outer peripheral parts of the respective bases 43, and the first end part 21 and the second end part 22 of the core body 2 are close to each other.

Next, in this state, as shown in FIG. 1 and FIG. 10, the bracket 71 of the clamping device 70 is attached to the base 43. At this time, the pair of holding pieces 72 may be removed from the bracket 71 or may be temporarily movably held to the bracket 71. With the bracket 71 attached to the base 43, the pair of holding pieces 72 are temporarily held to the bracket 71 by the fastening members 78. At this time, the free roller 3 attached to the first end part 21 of the core body 2 and the free roller 3 attached to the second end part 22 of the core body 2 are arranged between the pair of holding pieces 72. In this state, the fastening member 78 is tightened so that the pair of holding pieces 72 approach each other. The free roller 3 attached to the first end part 21 of the core body 2 and the free roller 3 attached to the second end part 22 of the core body 2 are sandwiched by the pair of holding pieces 72 to maintain the first end surface 28 and the second end surface 29 of the core body 2 in contact with each other. In this state, a contact part between the first end surface 28 and the second end surface 29 of the core body 2 is exposed to the outside through the opening 79 of the bracket 71. Then, the contact part between the first end surface 28 and the second end surface 29 is welded through the opening 79 of the bracket 71. The welding may be, for example, laser welding. Accordingly, the core body 2 is maintained in an annular shape.

Next, the pair of holding pieces 72 and the bracket 71 are removed from the base 43. Further, the plurality of band members 81 are removed from the bases 43. Then, the plurality of lock members 61 are removed from the corresponding bases 43. Accordingly, due to the urging force of the urging member 44, the base 43 moves toward the expanded position side, and the outer peripheral part of the base 43 comes into contact with the inner peripheral part of the wheel 4.

Next, respective contact parts between the first cut surface 24 and the second cut surface 25 of the core body 2 are welded. The welding may be laser welding. At this time, an irradiation part of a welding device may be arranged at a predetermined position, and by rotating the chuck 42, a welding position in the circumferential direction of the wheel 4 may be changed.

Due to contraction arising from the welding, a radius of the wheel 4 gradually decreases as the welding progresses. At this time, each base 43 moves toward the central axis C side against the urging force of the urging member 44, and the contact state with the wheel 4 is maintained. Each base 43 can move toward the central axis C side until it comes into contact with the stopper 54. After each base 43 comes into contact with the stopper 54, each base 43 supports the wheel 4 from the inner side to suppress contraction of the wheel 4. Accordingly, the core body 2 can be maintained in an appropriate shape.

After the welding is complete, the stopper 54 is removed from the chuck 42. Accordingly, the base 43 becomes movable toward the central axis C side. Then, by moving the plurality of bases 43 toward the central axis C side against the urging force of the plurality of urging members 44, the inner peripheral part of the wheel 4 and the outer peripheral parts of the plurality of bases 43 are separated from each other, and the wheel 4 is removed from the central member 40.

The wheel holding device 1 according to the disclosure holds a wheel 4 including an annular-shaped core body 2 and a plurality of free rollers 3 rotatably supported by the core body 2. A central member 40 is arranged at a central part of the annular-shaped wheel 4 and can hold the wheel 4 at its outer peripheral part. The outer peripheral part of the central member 40 can extend radially outward and come into contact with the inner peripheral part of the wheel 4.

The clamping device 70 can hold the cleaved core body 2 in an annular shape, and the first end surface 28 and the second end surface 29 of the core body 2 can be easily welded. Since the bracket 71 is formed with an opening 79, the welding work on the core body 2 becomes possible with the clamping device 70 attached to the wheel 4. Since the pair of holding pieces 72 are detachably attached to the bracket 71, after the bracket 71 is arranged with respect to the wheel 4, the pair of holding pieces 72 can be attached to the bracket 71. This facilitates the work of attaching the clamping device 70 to the wheel 4.

When the position of the base 43 is fixed by the lock members 61, the position of the wheel 4 can be kept constant by bringing the wheel 4 into close contact with the bases 43 by the plurality of band members 81.

The wheel 4 is used in the omnidirectional moving device 5. The omnidirectional moving device 5 includes, for example, as shown in FIG. 2, a frame 91, a pair of drive disks 92 rotatably supported by the frame 91, the annular-shaped wheel 4 arranged between the pair of drive disks 92, and a pair of electric motors which rotate the respective drive disks 92. The pair of drive disks 92 transmit the driving force of the electric motors to the wheel 4.

The frame 91 has a pair of sidewall parts extending downward from a lower part of the vehicle body. As shown in FIG. 2, a support shaft 97 extending in the left-right direction is bridged to a pair of lower ends of the frame 91. The pair of drive disks 92 are rotatably supported on the support shaft 97. The pair of drive disks 92 rotate on the axis of the support shaft 97. The position of each drive disk 92 in the left-right direction with respect to the support shaft 97 is restricted. The drive disks 92 face each other at a distance in the left-right direction.

The drive disks 92 are respectively arranged on two sides of the annular-shaped wheel 4, and apply a frictional force to the wheel 4 to rotate the wheel 4 on the axis A and around the annular-shaped core center line B. The drive disk 92 includes a disk-shaped base 101 rotatably supported by the frame 91, and a plurality of drive rollers 102 which are rotatably supported on an outer peripheral part of the base 101 to be inclined to each other and come into contact with the wheel 4. The base 101 is arranged coaxially with the support shaft 97.

Driven pulleys 104 are respectively provided on opposite surfaces of the drive disks 92. The driven pulley 104 is provided coaxially with the drive disk 92. The driven pulley 104 is connected by a belt 106 to a drive pulley provided on an output shaft of the electric motor. As the electric motors rotate independently of each other, the drive disks 92 rotate independently of each other.

In each omnidirectional moving device 5, when the pair of drive disks 92 rotate in a same direction at a same rotational speed, the wheel 4 rotates together with the pair of drive disks 92. That is, the wheel 4 rolls forward or backward on the axis A. At this time, the drive roller 102 of the drive disk 92 and the free roller 3 of the wheel 4 do not rotate with respect to the core body 2. In each omnidirectional moving device 5, when there is a difference in rotational speed between the pair of drive disks 92, with respect to a force in the circumferential (tangential) direction arising from rotation of the pair of drive disks 92, a component force in an orientation orthogonal to this force acts on the free rollers 3 of the wheel 4 from the left and right drive rollers 102. Since the axis of the drive roller 102 is inclined with respect to the circumferential direction of the drive roller 102, a component force is generated due to the difference in rotational speed between the drive disks 92. Due to this component force, the drive roller 102 rotates with respect to the base 101, and the free roller 3 rotates with respect to the core body 2. Accordingly, the wheel 4 generates a driving force in the left-right direction.

The vehicle body moves forward as the left and right omnidirectional moving devices 5 rotate forward at a same speed. The vehicle body moves backward as the left and right omnidirectional moving devices 5 rotate backward at a same speed. The vehicle body turns to the right or left as a speed difference is generated in the rotation of the left and right omnidirectional moving devices 5 in the front-rear direction. The vehicle body translates in the right or left direction as the free rollers 3 of each wheel 4 of the left and right omnidirectional moving devices 5 rotate.

Although the specific embodiments have been described above, the disclosure may be widely modified without being limited to the above embodiments. The pedestal 41 may include a mechanism for changing a height and an orientation of the central member 40. The shape and number of the bases 43 may be freely changed. The bracket 71 of the clamping device 70 may be attached to the pedestal 41. One of the holding pieces 72 may be formed integrally with the bracket 71. The main body part 74 of the bracket 71 may sandwich at least one free roller 3 with the base 43.

What is claimed is:

1. A wheel holding device which holds a wheel comprising an annular-shaped core body and a plurality of free rollers rotatably supported by the core body, the wheel holding device comprising:

a central member comprising an outer peripheral part capable of expanding and contracting in a radial direction, wherein the central member holds the wheel with the outer peripheral part of the central member urging an inner peripheral part of the wheel radially outward, wherein the central member comprises:

a chuck;

a plurality of bases which are radially movably supported by the chuck and form the outer peripheral part of the central member; and a plurality of urging members, each urging member comprising a spring, which urge the respective bases radially outward with respect to the chuck.

2. The wheel holding device according to claim 1, wherein the central member comprises a stopper detachably attached to the chuck, and the stopper restricts radially inward movement of the base by coming into contact with each of the bases.

3. The wheel holding device according to claim 1, wherein the central member comprises a plurality of lock members detachably attached to the chuck, and the plurality of lock members restrict movement of the bases with respect to the chuck by coming into contact with each of the bases.

4. The wheel holding device according to claim 3, comprising at least one band member which extends along an outer peripheral surface of one of the free rollers and comprises two end parts detachably attached to one of the bases.

5. The wheel holding device according to claim 2, wherein the central member comprises a plurality of lock members detachably attached to the chuck, and the plurality of lock members restrict movement of the bases with respect to the chuck by coming into contact with each of the bases.

6. The wheel holding device according to claim 5, comprising at least one band member which extends along an outer peripheral surface of one of the free rollers and comprises two end parts detachably attached to one of the bases.

7. The wheel holding device according to claim 1, comprising a clamping device comprising:

a bracket; and a pair of holding pieces which are provided on the bracket and sandwich the free rollers in a circumferential direction of the wheel.

8. The wheel holding device according to claim 7, wherein the bracket is detachably attached to one of the bases.

9. The wheel holding device according to claim 7, wherein the bracket has at least one opening for exposing, to outside, the core body arranged between the free rollers arranged between the pair of holding pieces.

10. The wheel holding device according to claim 7, wherein the pair of holding pieces are detachably attached to the bracket.

11. The wheel holding device according to claim 1, wherein the plurality of bases each have an engaging groove which extends in a circumferential direction and receives a part of the free roller.

12. The wheel holding device according to claim 1, comprising a pedestal which rotatably supports the chuck.

* * * * *